April 29, 1941.  H. V. ATWELL  2,240,433
MANUFACTURE OF GASOLINELIKE HYDROCARBONS
Filed Feb. 15, 1936
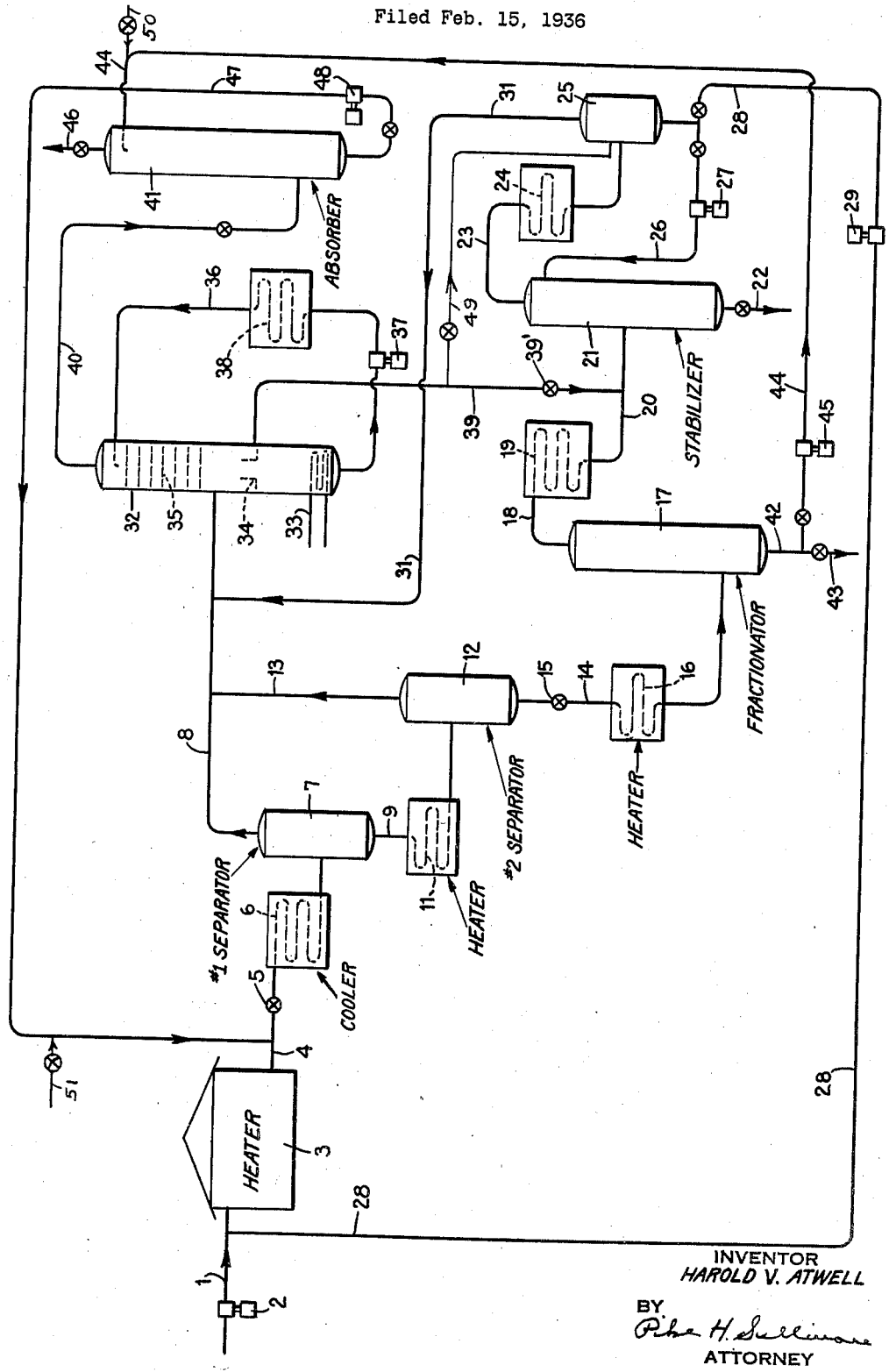
INVENTOR
HAROLD V. ATWELL
BY
*Pike H. Sullivan*
ATTORNEY Patented Apr. 29, 1941

2,240,433

UNITED STATES PATENT OFFICE 2,240,433

MANUFACTURE OF GASOLINELIKE HYDROCARBONS

Harold V. Atwell, White Plains, N. Y., assignor to Process Management Company, Inc., New York, N. Y., a corporation of Delaware Application February 15, 1936, Serial No. 64,047

4 Claims. (Cl. 196—10)

This invention relates in general to the conversion of normally gaseous hydrocarbons to normally liquid hydrocarbons, and more especially to the conversion or polymerization of normally gaseous hydrocarbons containing saturated and unsaturated constituents of from two to four carbon atoms per molecule to normally liquid gasolinelike constituents.

It is well known that hydrocarbons of the above character may be polymerized under elevated temperature and pressure conditions, or under lower temperatures and pressures with suitable catalysts, to produce normally liquid gasolinelike hydrocarbons. In thermal processes utilizing elevated temperatures and pressures, there is produced in the process a fixed gas, comprising hydrogen and methane, a normally liquid fraction comprising gasoline and heavier, and a normally gaseous fraction intermediate the fixed gas and the liquid fraction. Processes of this character provide for the recycling of the intermediate fraction to the polymerization heating zone to effect further conversion thereof into gasolinelike constituents.

My process contemplates polymerizing normally gaseous hydrocarbons containing saturated and unsaturated constituents of from two to four carbon atoms per molecule and separating the products of polymerization, after appropriate cooling, in successive separating zones maintained at elevated pressures and at progressively higher or increasing temperatures. In effecting the separation of the products of polymerization into gaseous and liquid fractions, the cooled products are passed to a first separating zone wherein fixed gas, comprising hydrogen and methane, and heavier gases entrained therewith and carried over thereby are separated as a gaseous overhead fraction, the remaining liquid fraction comprising normally liquid products of polymerization and hydrocarbon gases of from two or three to four carbon atoms per molecule in liquefied condition being withdrawn as a bottom fraction. In accordance with my invention, this bottom fraction is, prior to further separation thereof into gaseous and liquid fractions, moderately raised in temperature and passed to another separating zone to effect a separation therein of overhead and bottom fractions as aforesaid. The bottom liquid fraction remaining in the second separating zone, comprising the gasolinelike hydrocarbons and heavier and liquefied gaseous hydrocarbons suitable for recycling, is withdrawn therefrom and again heated to moderately elevate its temperature prior to fractionation. The thus heated liquid fraction is then fractionated to separately recover the various fractions contained therein, the normally gaseous hydrocarbon fraction containing constituents of from two or three to four carbon atoms per molecule being recycled to the polymerization heating zone for reprocessing.

The gaseous overhead fractions separated from the separating zones contain valuable condensible hydrocarbons and, in accordance with my process, are further treated to recover these condensible hydrocarbons for reprocessing in the polymerization heating zone. This recovery may be accomplished by using light and heavy absorbents formed within the system in successive stages, the non-condensible gases, such as hydrogen and methane, being withdrawn from the last stage. In recovering the condensible gases, the gaseous overhead fraction from each separating zone may be conducted into a combination rectification and scrubbing zone wherein the heavier hydrocarbons are condensed, a portion of these heavier hydrocarbons, after cooling, being returned to the upper portion of the combination rectification and scrubbing zone as the liquid absorbent or scrubbing medium therefor.

In order to make my invention more clearly understood, I have shown in the accompanying drawing, apparatus for carrying the same into practical effect without limiting the improvements in their useful applications to the particular embodiments which, for the purpose of explanation, have been made the subject of illustration.

In the drawing, the single figure is a somewhat diagrammatic elevational view of apparatus capable of carrying out my invention.

Referring to the drawing, normally gaseous hydrocarbons containing both saturated and unsaturated constituents from any suitable source, such as conventional cracking processes, and preferably after the removal of hydrogen and methane therefrom, are introduced into a line 1 and forced by a pump 2 as a stream of restricted cross-section through a suitable furnace 3. In passing through the furnace 3, the hydrocarbons are subjected to suitable temperature and pressure conditions to effect conversion or polymerization thereof into normally liquid hydrocarbons comprising gasolinelike constituents. The hydrocarbons are preferably heated in the furnace 3 to a temperature of between 750° and 1200° F. while being maintained under a superatmospheric pressure of between 500 and 3000 lbs. per sq. in., or higher, such as 5000 lbs. per sq. in. After the desired conversion or polymerization of the hydrocarbons is effected in the furnace 3 and, if desired, in an enlarged reaction chamber, not shown, the products of polymerization are passed through a line 4, pressure-control valve 5 and cooler 6 to a primary separator 7 maintained at a pressure of between about 300 and 500 lbs. per sq. in. The hot polymerized products prior to entering the separator 7 are cooled to a temperature of between about 0° and 50° F., preferably about 25° F. To accomplish this cooling, I intimately contact the hot polymerized products with a liquid oil containing dissolved hydrocarbon gases introduced through a line 47 and thereafter further cool the polymerized products and admixed oil by passage thereof through the cooler 6, which may be of the refrigeration type, that is, a cooler wherein normally gaseous hydrocarbons are expanded with the cold created thereby being utilized to cool the mixture of polymerized products and heavier oil.

The products entering the primary separating zone 7 are therein separated into a gaseous fraction and a liquid fraction, the gaseous fraction containing most of the hydrogen and methane together with small quantities of heavier gases. This gaseous fraction is withdrawn from the upper portion of the separator 7 through a line 8 for further processing, as will be later explained. The liquid fraction separated in the separator 7 comprises normally liquid hydrocarbons and liquefied normally gaseous hydrocarbons of from two to four carbon atoms per molecule together with some entrained hydrogen and methane.

In order to effect further separation of hydrocarbon gases contained in the liquid fraction, said liquid fraction is withdrawn from the lower portion of the separator 7 through a line 9 and passed to a heater 11, wherein it is moderately heated to a temperature of between 50° and 100° F., preferably to a temperature of about 75° F. The thus moderately heated fraction is passed from the heater 11 to a secondary separator 12 maintained under a pressure of between about 300 and 500 lbs. per sq. in. Further separation of the thus heated liquid fraction into a gaseous fraction and a liquid fraction is effected in a separator 12. The overhead fraction will comprise most of the remaining hydrogen and methane together with heavier gases carried over thereby and is withdrawn from the separator 12 through a line 13 and mixed with the aforementioned overhead fraction in the line 8.

The liquid fraction separated in the separator 12, which comprises gasolinelike constituents and heavier and saturated and unsaturated liquefied hydrocarbons of from two or three to four carbon atoms per molecule, is withdrawn therefrom through a line 14, having a pressure-control valve 15, and conducted through a heater 16 wherein it is heated to a temperature of about 400° F., sufficient to vaporize all of the gasoline constituents. The thus heated liquid fraction passes to a fractionator 17, having suitable fractionating plates and trays therein, maintained under a pressure of between about 200 and 300 lbs. per sq. in., wherein it is fractionated to separate oil heavier than gasoline as a bottom fraction and gasolinelike constituents admixed with gaseous hydrocarbons containing both saturated and unsaturated constituents of from two or three to four carbon atoms per molecule as an overhead fraction. The overhead fraction is withdrawn through a line 18, cooler or condenser 19, and conducted through a line 20 to a stabilizer 21 likewise provided with suitable fractionating means.

Gasolinelike hydrocarbons contained in the overhead fraction are separated from the normally gaseous hydrocarbons and are withdrawn from the stabilizer 21 through a line 22. Normally gaseous hydrocarbons separated within the stabilizer 21 are conducted as an overhead fraction through a line 23, condenser 24, to an accumulator or receiver 25. Condensible hydrocarbons are condensed in passing through the condenser 24 and are collected in liquefied condition in the receiver 25. A part of these liquefied hydrocarbons may be returned through a line 26 by a pump 27 to the upper portion of the stabilizer 21 as refluxing medium therefor. The remaining part of these gaseous hydrocarbons, which will contain saturated and unsaturated constituents of from two or three to four carbon atoms per molecule, is withdrawn from the receiver 25 through a line 28 and forced by a pump 29 to the inlet of the furnace 3 wherein it is converted or polymerized to gasolinelike constituents.

Hydrocarbon gases which are not liquefied in passing through the condenser 24 are withdrawn from the receiver 25 through a line 31 and conducted to the line 8 wherein they mix with the gaseous fractions separated from the separators 7 and 12. If necessary a pump, not shown, may be used in line 31 to overcome the pressure differential between receiver 25 and tower 32. The total gaseous fractions passing through the line 8 are conducted to a combination rectification and scrubbing tower 32 having bottom heating means 33, an intermediate trap-out tray 34, and fractionating plates or trays 35. In entering the tower 32, the gaseous fractions are therein subjected to a combined rectification and scrubbing operation, the heavier gases contained therein being separated from the upwardly rising gaseous fractions and collected on the intermediate trap-out tray 34 in liquefied condition. In operating the tower 32, part of the liquefied gases collected on the trap-out tray 34 overflows and descends to the bottom of the tower where it is gently heated by means of the coil 33 receiving a suitable heating medium, such as steam. Due to the heating of the liquefied gases by the coil 33, the lighter components are driven off, the remaining liquefied gases being passed through a line 36 and cooler 38 by a pump 37 to the upper portion of the tower 32 as refluxing medium therefor. The liquefied gaseous hydrocarbons utilized as a refluxing medium will generally contain hydrocarbons of three and four carbon atoms per molecule and will usually predominate in the latter. Liquefied hydrocarbons collected on the trap-out tray 34 are withdrawn from the tower 32 through a line 39, controlled by a valve 39', and are conducted to the stabilizer 21 wherein they are recovered and reprocessed in the manner previously described. Optionally these hydrocarbons may be directed through valved line 49 to receiver 25 for recycling to the polymerizing heater 3.

The unabsorbed and uncondensed gases in the tower 32 are conducted through a line 40 to an absorber 41. The oil heavier than gasoline, separated in the fractionator 17 and collected in the lower portion thereof, may be effectively used as an absorbent for the gaseous hydrocarbons passing through the absorber 41. If excessive oil of this character is built up in the process, a part thereof may be withdrawn from the fractionator 17 through a line 42 and discharged from the process through a line 43. The remaining part is utilized as an absorbent and is passed through a line 44 by a pump 45 to the upper portion of the absorber 41 wherein it flows countercurrently to the upwardly rising gaseous products. Other absorbent oil may be supplied from outside sources through line 50 if desired. The oil absorbent passing downwardly through the absorber 41 absorbs the heavier hydrocarbons contained in the upwardly rising gaseous products. Unabsorbed gases, comprising substantially all of the hydrogen and methane produced in the process and controlled amounts of ethane and ethylene if it is desired to withdraw such gases from the system, are withdrawn from the absorber 41 and discharged from the process through a line 46. The enriched absorber oil containing dissolved hydrocarbon gases therein is withdrawn from the lower portion of the absorber 41 through a line 47 and forced by a pump 48 to the line 4 where it intimately contacts the hot products of polymerization leaving the furnace 3. The enriched absorber oil, in addition to quenching the hot products of polymerization, makes possible the return of normally gaseous constituents dissolved therein to the process for further conversion or polymerization. If desired, additional oil or gas for quenching the hot products of polymerization may be introduced through line 51 from any convenient outside source.

It will be evident from the foregoing that I have provided a process wherein normally gaseous hydrocarbons are converted to normally liquid gasolinelike hydrocarbons, with the products of polymerization being effectively separated into gaseous and liquid fractions in successive separating stages maintained at higher temperatures, the gaseous fractions being thereafter treated with light and heavy absorbents in successive stages to recover valuable condensible hydrocarbons for further processing.

It will be understood that while my invention has been described with reference to preferred operating examples, it is not limited in its broader aspects to such operating details as have been set forth hereinabove by way of example, but may variously be practiced and embodied within the scope of the claims hereinafter made.

I claim:
1. A process of producing normally liquid gasolinelike hydrocarbons from normally gaseous hydrocarbons which comprises passing normally gaseous hydrocarbons comprising saturated and unsaturated constituents of from two to four carbon atoms per molecule through a heating zone and subjecting said hydrocarbons to elevated temperatures and pressures to effect polymerization thereof into gasolinelike constituents, cooling said products of polymerization, separating said products of polymerization into gaseous and liquid fractions while being maintained under pressure in a plurality of separating zones maintained at progressively higher temperatures, fractionating said liquid fraction to separate therefrom normally liquid hydrocarbons comprising gasolinelike constituents and normally gaseous hydrocarbons other than normally gaseous hydrocarbons separated in said plurality of separating zones, passing said gaseous fraction directly into an enlarged zone having upper and lower sections, subjecting said gaseous fraction in the upper section of the enlarged zone to rectification and scrubbing, flowing liquid constituents of the said gaseous fraction in the lower section of said enlarged zone, heating the liquefied constituents in the lower section of said enlarged zone to strip therefrom low-boiling hydrocarbons and to leave a residue consisting primarily of relatively high-boiling normally gaseous hydrocarbons, passing liquid constituents thus stripped of low-boiling materials to the upper portion of said enlarged zone as scrubbing medium, removing hydrogen and methane from the upper section of said enlarged zone, withdrawing from the said enlarged zone in liquefied condition from a point intermediate the upper and lower sections thereof a fraction consisting primarily of hydrocarbons having from two to four carbon atoms per molecule, and passing hydrocarbons thus withdrawn to the heating zone.

2. A process in accordance with claim 1 wherein the normally gaseous hydrocarbons separated from the said liquid fraction and hydrocarbons withdrawn in liquefied condition from the said enlarged zone at the said intermediate point thereof are merged and passed together to the heating zone.

3. A process for producing normally liquid gasolinelike hydrocarbons from normally gaseous hydrocarbons which comprises passing normally gaseous hydrocarbons comprising saturated and unsaturated constituents of from two to four carbon atoms per molecule through a heating zone and subjecting said hydrocarbons to elevated temperatures and pressures to effect polymerization thereof into gasolinelike constituents, cooling said products of polymerization, separating said products of polymerization into a gaseous fraction and a liquid fraction containing the gasoline product, fractionating the said liquid fraction to separate gasolinelike hydrocarbons from higher boiling oil, thereafter scrubbing and cooling the gas fraction to liquefy at least a portion thereof, utilizing a portion of the liquefied gases thus obtained to effect said scrubbing of the gas fraction, passing the hydrocarbons remaining in gaseous form to another scrubbing treatment, utilizing higher boiling oil obtained from the fractionation of the said liquid fraction as a scrubbing medium for the gaseous hydrocarbons in said last-mentioned scrubbing treatment to thereby absorb gaseous hydrocarbons therein, and cooling said products of polymerization by intimately contacting them with said higher boiling oil containing absorbed gaseous hydrocarbons.

4. A process for converting normally gaseous hydrocarbons to normally liquid gasolinelike hydrocarbons which comprises subjecting normally gaseous hydrocarbons of two to four carbon atoms per molecule to polymerizing conditions of temperature and pressure to effect substantial conversion thereof to gasolinelike constituents, fractionating the polymerized products to separate therefrom a liquid fraction including the gasoline product and a gaseous fraction including saturated and unsaturated hydrocarbons of from two to four carbon atoms per molecule, passing said gaseous fraction into an enlarged fractionating zone having upper and lower sections, subjecting said gaseous fraction in the upper section to rectification and scrubbing, flowing liquefied constituents of said gaseous fraction into the lower section of said enlarged zone, heating the said liquefied constituents in the lower section of said enlarged zone to strip therefrom low-boiling hydrocarbons and to leave a residue consisting primarily of relatively high boiling normally gaseous hydrocarbons, passing liquid constituents thus stripped of low-boiling material to the upper section of said enlarged zone in liquid condition as a scrubbing medium, withdrawing a liquefied fraction consisting primarily of hydrocarbons having from two to four carbon atoms per molecule from said fractionating zone at a point intermediate the upper and lower sections thereof, passing hydrocarbons thus withdrawn to said polymerization treatment, withdrawing uncondensed gases from the upper section of said enlarged fractionating zone, passing said uncondensed gases externally of said fractionating zone in countercurrent contact with a normally liquid absorption medium to absorb valuable hydrocarbons therefrom, and passing the enriched absorption medium into intimate contact with the products of polymerization to effect cooling thereof.

HAROLD V. ATWELL.